L. S. LACHMAN.
ROLLER FOR CASTERS.
APPLICATION FILED NOV. 29, 1910.

1,085,090.

Patented Jan. 20, 1914.

WITNESSES
J. Richards
John J. Ranagan

INVENTOR
L. S. Lachman
BY
Wm. A. Megrath
ATTORNEY

UNITED STATES PATENT OFFICE.

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

ROLLER FOR CASTERS.

1,085,090.  Specification of Letters Patent.  Patented Jan. 20, 1914.

Application filed November 29, 1910. Serial No. 594,656.

*To all whom it may concern:*

Be it known that I, LAURENCE S. LACHMAN, a citizen of the United States, and a resident of the city, county, and State of New York, have invented certain new and useful Improvements in Rollers for Casters, of which the following is a specification.

Figure 1:
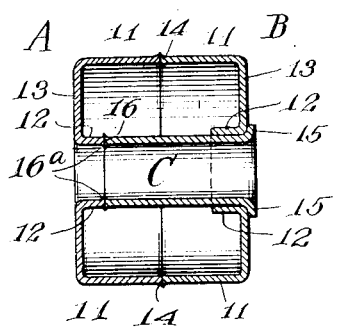
Figure 2:
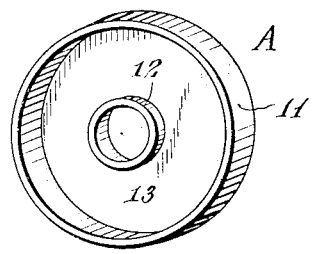
Figure 3:
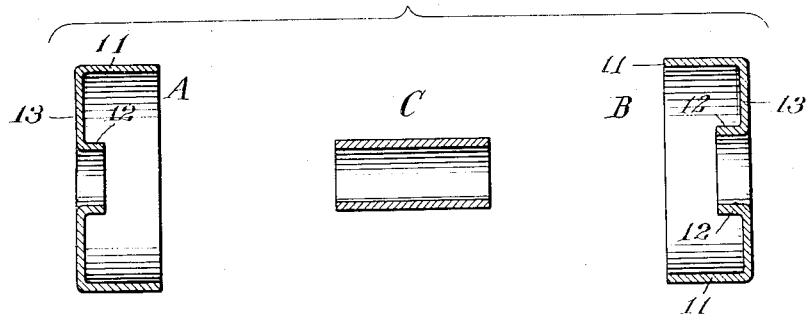
Figure 4:
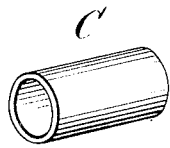

This invention relates to improvements in rollers for casters and the like, and its object is to provide a roller of most inexpensive, durable and neat construction. This object is well secured by the construction illustrated in the accompanying drawings, in which:

Figure 1 is a sectional view of a roller embodying the present improvements. Fig. 2 is a perspective view of one of the members forming the body thereof. Fig. 3 is a view showing the several members in section and separated from each other; and Fig. 4 is a perspective view of the member forming the bearing for the journal or spindle upon which the roller is mounted when it is in use.

Similar characters of reference designate similar parts in the several views.

The herein illustrated roller of the present invention comprises three members to wit: two complementary body members, marked A and B, respectively, and an axial or bearing member, marked C. Preferably the body members are such as to form complementary halves, and each comprises a pair of separated concentric flanges, marked 11 and 12, respectively, and a wall, marked 13, which connects the flanges with each other. The flanges 11 of the body members form the tread of the roller, and in forming the roller these flanges are placed with their free edges in contact with each other and said edges (as shown at 14) are then integrally united, preferably by electric welds, though other approved welds may be employed if desired.

The member C which forms a bearing sleeve, is of tubular form and is preferably provided at one end with a peripheral flange 15 which rests against the outer surface of the wall 13 of the member B. It is tightly fitted to the flange 12 of the member B and its inner edge abuts the edge of the flange 12 of the member A and is integrally united to the latter by electric or other approved weld, as shown at 16. The member C may be welded electrically or otherwise, to the flange 12 or wall 13, or both, of the member B, or otherwise secured thereto, if desired.

In assembling the parts of the herein exemplified form of the present invention, the members A and C are placed in position with the end of C in contact with the end of the flange 12 of A. These ends are then welded together and the projection or bur 16ª formed on the inner surface of these parts, in welding them together, is ground off or otherwise suitably removed to give a smooth surface for the axial or shaft. After this has been done, the member B is mounted upon the member C and forced along the latter until the edges of the flanges 11, 11 of members A and B are in contact with each other. These edges are then welded together and the outstanding ridge or projection on the periphery of the roller, produced in welding is suitably removed to give the roller a smooth tread. The member C may then be welded to the flange 12 of member B and the projecting end of said member C may be spun or turned over to form the flange 15 which finally may be welded to the wall 13, if the employment of these supplemental means of fastening the parts together is desired.

From the foregoing it will be seen that the present invention provides a roller composed of but a few parts whose forms are such that they may be readily and inexpensively produced, from sheet metal, for example, and further are such that while primarily they are of separate formation yet they may be readily integrally united with each other in a most inexpensive and practicable way, to provide a roller of substantially integral and durable construction, as well as one of most neat form.

Changes in the details of the parts, herein particularly set forth, may be made within the spirit of the invention and the scope of the subjoined claims.

Having thus described the invention what I believe to be new and desire to secure by Letters Patent is:

1. A roller comprising complementary body members each having inner and outer flanges, spaced apart, the outer flanges forming the tread of the roller and having their edges integrally united to each other, and a tubular member having an end and side engagement with the inner flanges, 2. A roller comprising complementary body members each having inner and outer flanges, spaced apart, the outer flanges forming the tread of the roller and having their edges integrally united to each other, and a tubular member which forms the axis of the roller and has its inner end integrally united to the inner edge of one of the inner flanges.

3. A roller comprising complementary body members each having inner and outer concentric flanges, the outer flanges forming the tread of the roller and having their edges integrally united to each other, and a tubular member which forms the axis of the roller, said tubular member being tightly fitted into one of the inner flanges and having one end provided with a flange engaging the wall of the roller adjacent to the latter flange and its other end integrally united to the other inner flange.

4. A roller provided with an axial flange and a bearing sleeve whose end is engaged with the end of said flange and is integrally united thereto.

In witness whereof I have hereunto set my hand at the city, county and State of New York, this 25th day of November, 1910.

LAURENCE S. LACHMAN.

In presence of—
I. R. RICHARDS,
A. C. O'CONNELL.